June 11, 1963   E. R. ZIEGLER   3,093,082
WINDSHIELD WASHER
Filed Jan. 10, 1961
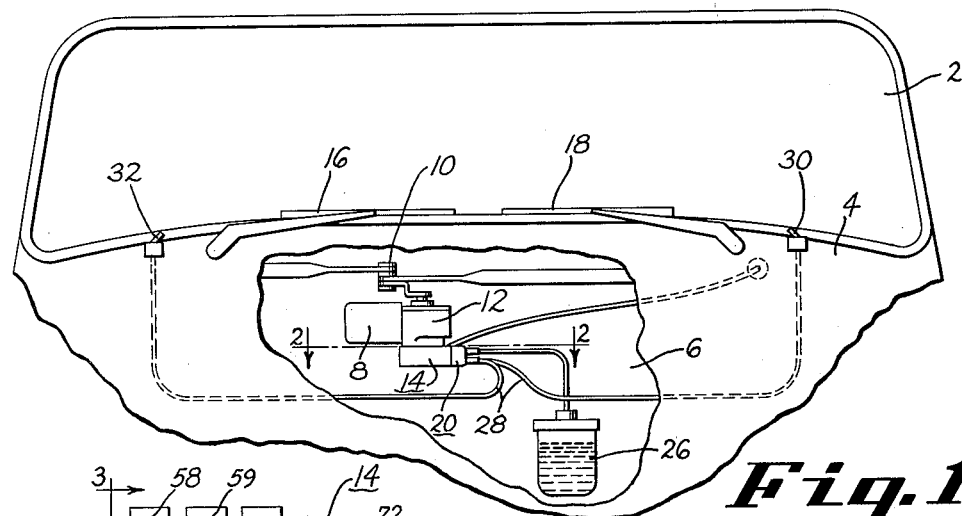
Fig.1
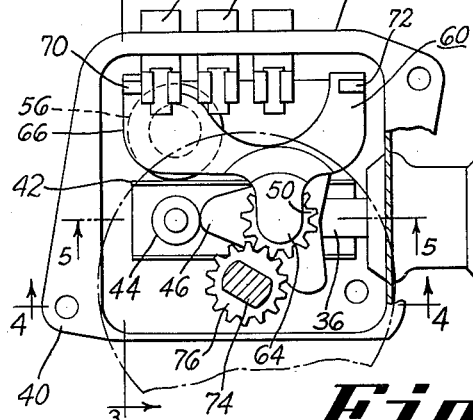
Fig.2
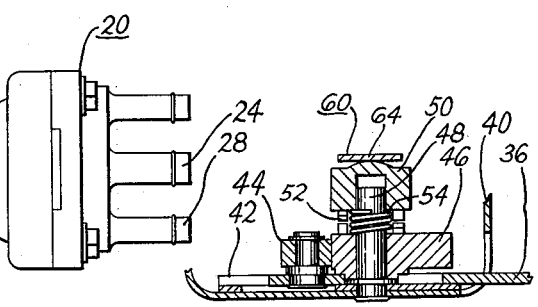
Fig.5
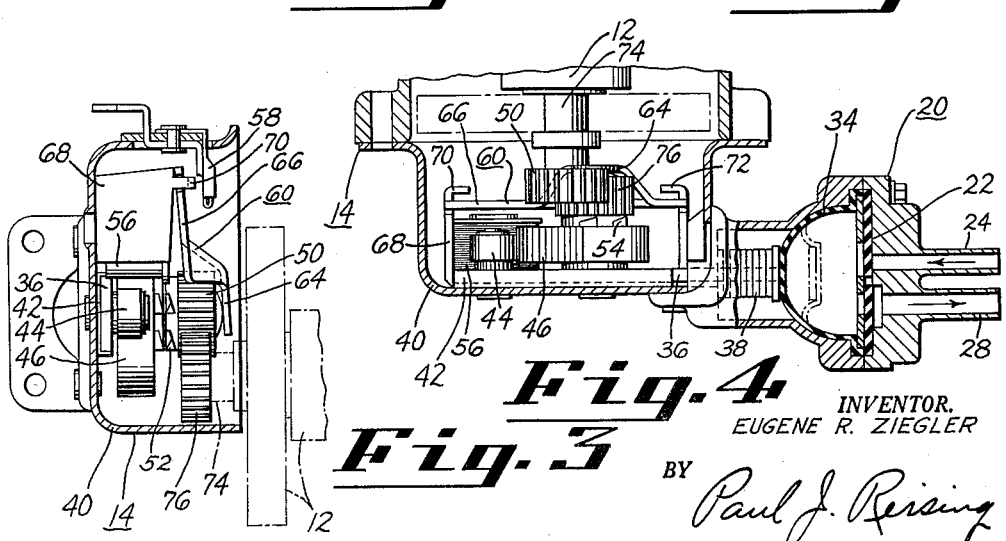
Fig.4
Fig.3
INVENTOR.
EUGENE R. ZIEGLER
BY Paul J. Reising
HIS ATTORNEY

United States Patent Office 3,093,082
Patented June 11, 1963

3,093,082
WINDSHIELD WASHER
Eugene R. Ziegler, Spencerport, N.Y., assignor to General Motors Corporation, Detroit, Mich., a corporation of Delaware
Filed Jan. 10, 1961, Ser. No. 81,770
4 Claims. (Cl. 103—23)

This invention relates to a windshield cleaning system for automotive vehicles and the like and has as its principle object the provision of an improved low cost demand-type washer unit for such a system. More specifically, it is an object of the present invention to provide a durable and reliable windshield washer mechanism, the structural features of which are such that almost all of its principle components can be made of relatively inexpensive sheet metal or molded plastic construction. Briefly, the invention comprehends a windshield washer which includes a pump operated by a rod reciprocated by a rotatable cam, a gear operatively connected for rotation by the windshield wiper motor, and a relay actuated clutch detachably connecting the gear to the cam. Hence, with the windshield wipers in operation, actuation of the relay by a suitable control in the vehicle driver compartment causes rotation of the cam and therefore operation of the washer for the period during which the relay is maintained actuated by the driver.

Other important features along with other objects and advantages of the invention will appear more clearly from the following detailed description of a preferred embodiment thereof made with reference to the accompanying drawings in which:

FIGURE 1 is a fragmentary view with parts broken away of a vehicle having a windshield cleaning system embodying the invention;

FIGURE 2 is a view taken on the line 2—2 of FIGURE 1 and shows a windshield washer mechanism constructed in accordance with the invention;

FIGURE 3 is a view taken on the line 3—3 of FIGURE 2;

FIGURE 4 is a view taken on the line 4—4 of FIGURE 2; and

FIGURE 5 is a view taken on the line 5—5 of FIGURE 2.

With particular reference now to the drawings, in FIGURE 1 there is shown a vehicle having a windshield 2, a cowl 4 and a firewall 6. Mounted on the firewall is a windshield wiper-washer system comprising a unidirectional electric motor 8 having a continuous driving connection with a crank assembly 10 through a gear train unit 12, and washer unit 14 secured to the gear train unit and driven by the motor 8. Suitable drive links connected to the crank assembly 10 drive the windshield wiper blades 16 and 18. The precise construction of the gear train unit and the other portions of the motion translating mechanism for the windshield wipers form no part of the present invention and can be of conventional construction.

The washer unit 14, which constitutes the subject matter of the present invention, includes a pump 20 connected through a check valve assembly 22 to an intake conduit 24 which communicates with a reservoir 26 of liquid solvent, and to outlet conduits as shown at 28 which deliver the pumped solvent to nozzles 30 and 32 mounted in the cowl for discharge of the solvent onto the windshield.

Referring now to FIGURES 2 through 5, the washer pump 20 comprises an elastomeric bulb 34 having an open end communicating with the check valve assembly 22, the closed end of the bulb being connected to one end of a reciprocable pump rod 36 of flat sheet metal construction. A portion of the pump rod is encircled by a compressible spring (see FIGURE 4) 38 biased between the elastomeric bulb and the pump casing, the spring constantly acting in a manner tending to collapse the bulb and thereby effect the delivery stroke of the pump. The pump casing is secured to the wall of housing 40 and the pump rod extends through an opening in the housing and terminates in an enlarged flat portion slidably supported by a pump rod guide channel 42 secured to the back wall of the housing. A cam follower roller 44 rotatably secured to the pump rod adjacent the free end thereof is biased into contact with multi-lobed cam 46 by the spring 38. Secured to the back of the housing and extending through a hole in the channel and through an elongated slot in the pump rod is a shaft 48 which rotatably supports in side-by-side position the multi-lobed cam 46 and a cam drive gear 50, both of which can be of molded nylon or other suitable plastic construction. As can best be seen in FIGURES 3 and 5, the adjacent faces of the cam and the drive gear are provided with circumferentially arranged teeth to thereby form a splined coupling 52 between these two members. The cam drive gear 50 is slidable on the shaft toward and away from the cam, and a spiral spring 54 (see FIGURE 5) encircling the shaft biases the gear away from the cam such that the splined coupling is normally disengaged.

Also secured to the back of the housing is an electromagnet 56 which is energized by way of a suitable control (not shown) on the vehicle instrument panel, the electrical contacts for the control circuit being shown at 58 and 59. (The third contact shown and contact 59 are for energizing the motor.) An armature 60 for the electromagnet is formed by a generally yoke-shaped sheet steel member having a raised projecting portion 64 abutting the axial end of the cam drive gear and having an enlarged leg portion 66 facing the electromagnet. An armature support bracket 68 also formed of sheet metal, is secured to the back of the housing and a hinge connection between the armature and its support is formed by a pair of notches in the leg portions of the armature which are in loose mating engagement with a pair of outwardly and then inwardly extending tabs 70 and 72 on the armature support. As can best be seen in FIGURE 3, tabs 70 and 72 limit the extent of backward movement of the armature 60 and when electromagnet 56 is not energized the spring 54 maintains the armature pivoted backwardly away from the electromagnet and in contact with the tabs such that there is no vibration or other unauthorized movement of the armature.

A second shaft 74, parallel to shaft 46, rotatably supports gear 76 which is meshed with the cam drive gear 50, gear 76 being constantly driven, through the wiper gear train unit schematically depicted at 12, by the motor 8 during windshield wiper operation. It is to be understood that while the drive means for the structure shown comprises an electric motor and gear 76, other suitable means causing rotation of the drive gear 50 may be used. For example, instead of an electric motor, a vacuum or fluid pressure motor can be employed and, if desired the connection from the motor to the drive gear can be through means other than a gear such for example, as through a Bowden wire.

Operation is as follows: With the windshield wipers in operation, gears 76 and 50 are constantly driven by the motor 8, however, no motion is imparted to cam 46 until energization of the electromagnet by way of a suitable electrical switch controlled from the vehicle driver compartment. When the electromagnet is energized armature 60 is pulled thereto and presses cam drive gear 50 toward cam 46, against the pressure of spring 54, thereby causing engagement of splined clutch 52. With the clutch engaged, as shown in FIGURE 4, the rotary motion of the drive gear 50 is imparted to the cam, which, in combination with spring 38, imparts reciprocating motion to the pump rod through roller 44 which rides on the cam. Hence, the pump is caused to operate during the period the electromagnet is energized. Upon deenergization of the electromagnet, spring 54 causes disengagement of the clutch 52 and the armature is pivoted to its backward position as shown in FIGURE 3.

In the preferred embodiment which is shown, there is a four-to-three gear ratio between gears 76 and 50, and the cam 46 has three lobes; this arrangement allows the use of a cam of relatively small outside diameter to attain the desired pumping rate for the system.

If desired, a single push button or similar control on the vehicle instrument panel can be used to cause actuation of the windshield wipers and to actuate the washer for the period during which the button is depressed, a separate control being provided to deactuate the wipers.

By reason of the structure and arrangement of parts, the washer unit can be produced relatively inexpensively and yet provides excellent reliability and durability as well as excellence of performance.

It will be understood that while the invention has been described by reference to a particular and preferred embodiment thereof, changes and alterations may be made all within the full and intended scope of the claims which follow.

I claim:

1. A windshield washer comprising a housing, a pump secured to said housing, a spring biased reciprocable rod slidably supported in said housing for operating said pump, a cam rotatably supported by a shaft in said housing, a cam follower on said rod in engagement with said cam such that when the cam rotates the rod is caused to reciprocate, a drive member rotatably supported by said shaft adjacent said cam and slidable on said shaft into and out of engagement with said cam, the opposed faces of said cam and said member forming a clutch such that when said faces are engaged the rotation of said member causes rotation of said cam, a spring disposed between said member and said cam and encircling said shaft for biasing said member out of engagement with said cam, and means to cause said drive member to slide into engagement with said cam against the action of said spring.

2. A windshield washer comprising a housing, a pump secured to said housing, a spring biased reciprocable rod slidably supported in said housing for operating said pump, a multilobed cam rotatably supported by a shaft in said housing, a cam follower on said rod in engagement with said cam such that when the cam rotates the rod is caused to reciprocate, a gear rotatably supported by said shaft adjacent said cam and slidable on said shaft into and out of engagement with said cam, the opposed faces of said cam and said gear forming a clutch such that when said faces are engaged the rotation of said gear causes rotation of said cam, a spring disposed between said gear and said cam and encircling said shaft for biasing said gear out of engagement with said cam, drive means operatively connected to said gear to cause rotation thereof, and electrically actuated means for sliding said gear into engagement with said cam against the action of said spring.

3. A windshield washer comprising a housing, a pump secured to said housing, a spring biased reciprocable rod slidably supported in said housing for operating said pump, a multi-lobed cam rotatably supported in said housing, a cam follower on said rod in engagement with said cam such that when the cam rotates the rod is caused to reciprocate, a rotatable drive member rotatably supported adjacent said cam in side-by-side relationship therewith and movable into and out of engagement with said cam, the opposed faces of said member and said cam forming a clutch such that when said faces are engaged the rotation of said member causes rotation of said cam, spring means disposed between said cam and said member and biasing said member out of engagement with said cam, an electromagnet in said housing, and an armature for said electromagnet pivotally supported in said housing, a portion of said armature being in engagement with said member such that when the electromagnet is energized the armature is pivoted into engagement therewith and thereby causes movement of said member into engagement with said cam.

4. A windshield washer comprising a housing having a channel-shaped member secured therein, a pump secured to said housing, a spring biased reciprocable rod slidably supported in said channel member for operating said pump, a multi-lobed cam rotatably supported by a shaft in said housing, a cam follower roller on said rod in engagement with said cam such that when the cam rotates the rod is caused to reciprocate, a gear rotatably supported by said shaft adjacent said cam and slidable on said shaft into and out of engagement with said cam, the opposed faces of said cam and said gear forming a splined clutch such that when said faces are engaged the rotation of said gear causes rotation of said cam, a spring disposed between said gear and said cam and encircling said shaft for normally biasing said gear out of engagement with said cam, a second gear in said housing operatively connected for rotation by a motor and meshed with said first mentioned gear, an electromagnet in said housing, and an armature pivotally supported in said housing and engaging said first mentioned gear such that the pivotal movement of said armature effected by energization of said electromagnet causes said first mentioned gear to slide into engagement with said cam against the action of said spring and thereby transmit the rotary movement of said second mentioned gear to said cam.

References Cited in the file of this patent

UNITED STATES PATENTS

| 1,788,027 | May | Jan. 6, 1931 |
| 1,993,583 | Arena | Mar. 5, 1935 |
| 2,878,505 | Ziegler | Mar. 24, 1959 |
| 2,936,476 | Ziegler | May 17, 1960 |
| 2,957,420 | Reynolds | Oct. 25, 1960 |
| 2,959,803 | Ziegler | Nov. 15, 1960 |

FOREIGN PATENTS

| 208,045 | Switzerland | Dec. 31, 1939 |
| 556,821 | Great Britain | Oct. 22, 1943 |
| 851,486 | Great Britain | Oct. 19, 1960 |
| 1,060,728 | Germany | July 2, 1959 |
| 1,092,325 | Germany | Nov. 3, 1960 |